United States Patent [19]
Chen et al.

[11] Patent Number: 5,970,154
[45] Date of Patent: Oct. 19, 1999

[54] APPARATUS AND METHOD FOR ECHO CANCELLATION

[75] Inventors: Wen-Yuan Chen, Hsinchu; Chih-Hung Kuo, Kaoshun, both of Taiwan

[73] Assignee: Industrial Technology Research Institute, China

[21] Appl. No.: 08/876,481

[22] Filed: Jun. 16, 1997

[51] Int. Cl.$^6$ .................................................. H04B 3/20
[52] U.S. Cl. ........................... 381/66; 381/93; 379/410; 379/390
[58] Field of Search .................. 381/66, 93, 96, 381/94.1, 94.2, 94.3; 379/390, 395, 410

[56] References Cited

U.S. PATENT DOCUMENTS

| | | |
|---|---|---|
| 5,272,695 | 12/1993 | Makino et al. . |
| 5,400,399 | 3/1995 | Umemoto et al. . |
| 5,473,686 | 12/1995 | Virdee . |
| 5,477,534 | 12/1995 | Kusano . |
| 5,548,642 | 8/1996 | Diethorn . |
| 5,577,116 | 11/1996 | Townsend et al. ...................... 379/410 |
| 5,721,730 | 2/1998 | Genter ..................................... 370/288 |

OTHER PUBLICATIONS

"Psychoacoustic Model 1 for Lower Sampling Frequencies", SO/IEC DIS 13818–3, Annex D, pp. 87–92.

*Primary Examiner*—Ping Lee
*Attorney, Agent, or Firm*—Finnegan, Henderson, Farabow, Garrett & Dunner, L.L.P.

[57] ABSTRACT

Apparatus and method for echo cancellation that incorporate a psychoacoustic model in determining the necessity to update compensator coefficients for the generation of artificial echoes for echo cancellation. The method includes the steps of dividing an audio signal having at least one echo into a plurality of subbands. For each of the plurality of subbands, the echo is reduced based on a variable coefficient transfer function to produce a compensated subband. The signal level of the compensated subband is then compared to a threshold value on a psychoacoustic model curve at a corresponding subband frequency. If the signal level of the compensated subband is greater than the threshold value, the coefficients of the transfer function are updated. Conversely, if the signal level of the compensated subband is less than or equal to the threshold value, the coefficients of the transfer function are not updated.

15 Claims, 5 Drawing Sheets

Fig. 1

PRIOR ART

APPARATUS AND METHOD FOR ECHO CANCELLATION

BACKGROUND OF THE INVENTION

1. Field of the Invention

The present invention relates to echo cancellation in telecommunication systems. More particularly, the present invention relates to a novel apparatus and method for echo cancellation that incorporates a psychoacoustic masking effect.

2. Description of the Related Art

An increasingly popular form of telecommunication is one that allows for "hands-free" operation, such as a speakerphone or teleconferencing equipment. However, these types of telecommunication equipment are susceptible to interference, particularly to, echoes.

In general, there are two types of echoes, electrical and acoustical. An electrical echo is generated when a portion of an electrical signal that represents acoustical information is reflected and returned to its source because of impedance mismatch or discontinuity between a signal source and a transmission line. A typical example of an electrical echo is one that occurs between a four-wire telecommunication circuit, which has two wires for each of a loudspeaker and a microphone, and a two-wire transmission cable. Impedance mismatch often occurs where the two-wire cable connects to the four-wire unit.

An acoustic echo, meanwhile, is generated largely due to the close proximity of a loudspeaker and a microphone of a telecommunication system, as in a speakerphone. In general, acoustic echoes are created when an audio signal from a far-end user of the system is broadcasted by the loudspeaker and picked up by the microphone either directly or indirectly by acoustic reflections off walls of the room in which the loudspeaker and microphone are located. Echoes of the audio signal of the far-end user are combined with an audio signal of a near-end user of the system, also picked up by the microphone, and returned to the far-end user. Echoes of the audio signal of the near-end user may similarly be created at the far-end of the system and returned to the near-end user.

Echoes are annoying to users of the telecommunication system because reverberations of a previously uttered phrase arrive as a new phrase is being uttered. Therefore, echo cancelers are used to remove the echoes or reduce them to an acceptable level. A common type of echo canceler is a subband echo canceler that divides a wideband signal into discrete subbands.

A subband echo canceler removes or reduces echoes in each subband and generally includes a plurality of compensators, also known as adaptive filters, or variable coefficient filters, wherein one or more of the plurality of compensators may be allocated to each of the subbands. The compensators or filters may be digital finite impulse response filters and the filter coefficients are generally updated for each subband by a number of known algorithms, such as the normalized least mean square ("NLMS") algorithm. The plurality of compensators generate a plurality of audio signals, illustratively as artificial acoustic echoes, such that at least one artificial acoustic echo is generated for each of the subbands to cancel the echo therein. A synthesizer recombines the subbands, having echoes reduced or removed therefrom, into a wideband signal and the recombined signal is transmitted to another part of the system.

Figure 1:
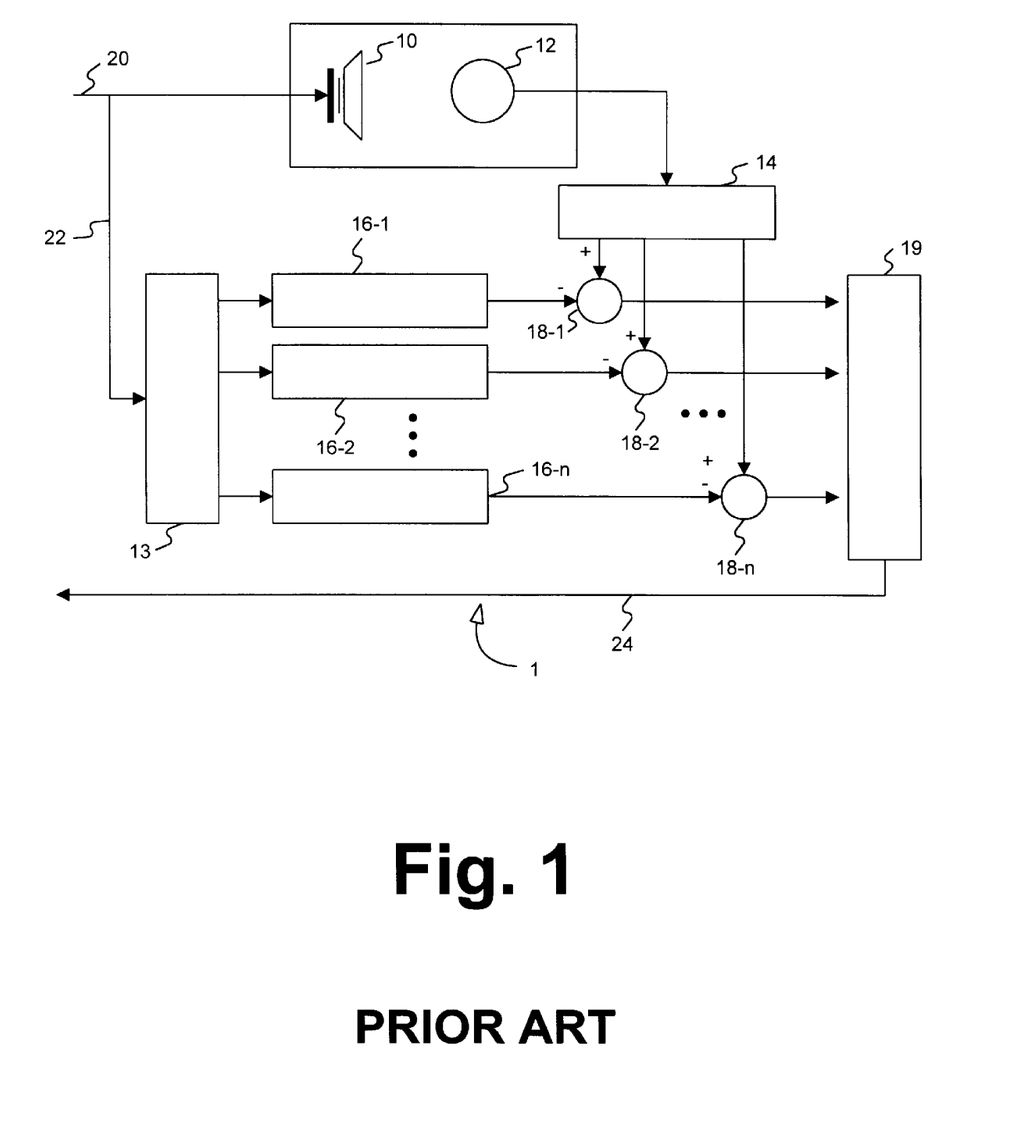
FIG. 1 shows a block diagram of a conventional subband acoustic echo canceler.

FIG. 1 shows a block diagram of a conventional subband acoustic echo canceler 1, which includes an input line 22, a first analyzer 13, a plurality of compensators, 16-1,16-2 . . . 16-n, a second analyzer 14, a plurality of subtractors, 18-1, 18-2 . . . 18-n, a synthesizer 19, and an output line 24. A first audio signal from a far-end user is transmitted through a transmission line 20 and broadcasted through a loudspeaker 10 of a near-end user receiving the transmission. The first audio signal enters a microphone 12, either directly or indirectly with various time delays from reflecting off walls (not shown) in a room where loudspeaker 10 and microphone 12 are located. Input line 22 is connected to transmission line 20 and transmits the first audio signal to first analyzer 13, which divides the first audio signal into a predetermined number of subbands. First analyzer 13 is connected to the plurality of compensators, 16-1,16-2 . . . 16-n, where n is equal to the number of subbands. Each of the compensators generates an artificial echo in each subband based on a weighted transfer function therein and the corresponding subband signal of the first audio signal. Factors that contribute to the "weights" of the transfer function include the number of subbands, known gross characteristics of acoustic impulse response functions, a number of taps allocated for each subband, and a masking effect of a psychoacoustic model. Each of the plurality of compensators is connected to a corresponding one of the plurality of subtractors, 18-1, 18-2 . . . 18-n, where n is equal to the number of subbands.

Microphone 12 also picks up a second audio signal, which includes echoes of the first audio signal and audio signals from the near-end user.

The second audio signal is transmitted to second analyzer 14 coupled to the plurality of subtractors 18-1, 18-2 . . . 18-n. Analyzer 14 divides the second audio signal into n number of subbands in the frequency domain according to predetermined subband intervals for echo canceler 1. Each second audio signal subband is provided to one of the plurality of subtractors, and the subband is subtracted from one of the artificial echoes generated by the plurality of compensators 16-1, 16-2 . . . 16-n at the corresponding subband frequency. Outputs of the plurality of subtractors, preferably having echoes of the first audio signal removed or greatly reduced, are also known as compensated subband signals and they are provided to synthesizer 19 to recombine the compensated subband signals of the second audio signal. The recombined second audio signal is then transmitted to the far-end user through output line 24.

The effectiveness of an echo canceler may be improved by increasing the number of subbands divided from a signal. Alternatively, there have been various attempts to incorporate the psychoacoustic masking effect into the considerations for updating compensator coefficients. The psychoacoustic masking effect is based on a mathematical model of the masking behavior of the human auditory system wherein an audio signal is imperceptible by human ears when its signal level is below a variable threshold level. This threshold level is frequency dependent and variable according to the presence or absence of other audio signals. In other words, an audio signal may be perceivable under one noise environment and becomes imperceptible under another. These phenomena has been incorporated in many audio and speech compression techniques, including the MPEG-2 standard.

Diethorn describes the incorporation of the psychoacoustic masking effect into an "Optimization of Adaptive Filter Tap Settings for Subband Acoustic Echo Cancelers in Teleconferencing" in U.S. Pat. No. 5,548,642 issued on Aug. 20, 1996. Diethorn describes a subband acoustic echo canceler that incorporates indicia of human perceptual phenomena into an adaptive filter tap allocation table, including predetermined speech power spectra for male and female speakers. The number of taps is fixed, but the allocation of taps among the subbands is "weighted", depending on factors such as the acoustic impulse response of the room in which the echoes are generated and weighting adjustments based on one or more measures of perceived human acoustic sensitivity.

SUMMARY OF THE INVENTION

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages, and in accordance with the purpose of the invention as embodied and broadly described, the invention is directed to a method for subband echo cancellation in a telecommunication system. The method includes the steps of dividing an audio signal having at least one echo into a plurality of subbands. For each of the plurality of subbands, the echo is reduced based on a variable coefficient transfer function thereby producing a compensated subband. The signal level of the compensated subband is compared to a threshold value on a psychoacoustic model curve at a corresponding subband frequency. If the signal level of the compensated subband is greater than the threshold value, the coefficients of the transfer function are updated.

In another aspect, the step of reducing echo includes the steps of generating an artificial echo based on the variable coefficient transfer function and subtracting the artificial echo from the selected subband.

In yet another aspect, the psychoacoustic model curve accounts for interference due to additional audio signals.

Further in accordance with the present invention, there is provided a subband echo canceler in a telecommunication system. The subband echo canceler includes compensating means to generate an artificial echo based on a first audio signal subband and a variable coefficient transfer function, and arithmetic means, coupled to the compensating means, to subtract the artificial echo from a second audio signal subband. The second audio signal subband includes echoes of the first audio signal subband. The echo canceler also includes control means, coupled to the arithmetic means, to determine whether to update coefficients of the variable coefficient transfer function by comparing an output of the arithmetic means with a value on a psychoacoustic model curve at the corresponding subband frequency of the first audio signal subband.

Also in accordance with the present invention, there is provided an echo canceler, which includes first analyzing means to divide a first audio signal into a plurality of first subbands and second analyzing means to divide a second audio signal into a plurality of second subbands. Each of the second subbands corresponds to one of the first subbands in the frequency domain. The echo canceler also includes at least one compensating means to receive one of the first subbands and to generate an artificial echo based on the received first subband and a variable coefficient transfer function. Furthermore, the echo canceler includes at least one arithmetic means, coupled to the compensating means, to subtract the artificial echo from one of the second subbands at the corresponding frequency. The echo canceler also includes control means, coupled to the arithmetic means, to determine whether to update coefficients of the variable coefficient transfer function by comparing an output of the arithmetic means with a value on a psychoacoustic model curve at a corresponding subband frequency.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiments of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

The present invention provides an apparatus and method for echo cancellation by taking into consideration psychoacoustic models to determine the need to update compensator coefficients of variable coefficient transfer functions. Specifically, instead of updating compensator coefficients for each subband, the method and apparatus in accordance with the present invention only updates compensator coefficients when the signal level of a compensated subband, one having echoes removed or reduced, is above the psychoacoustic threshold level.

Therefore, an acoustic echo canceler according to the present invention includes means for determining, on a subband-by-subband basis, whether or not to update coefficients of a transfer function of a variable coefficient compensator with reference to a psychoacoustic masking model. In a preferred embodiment, the psychoacoustic masking model incorporates and adjusts for interference due to other audio signals.

Figure 2:
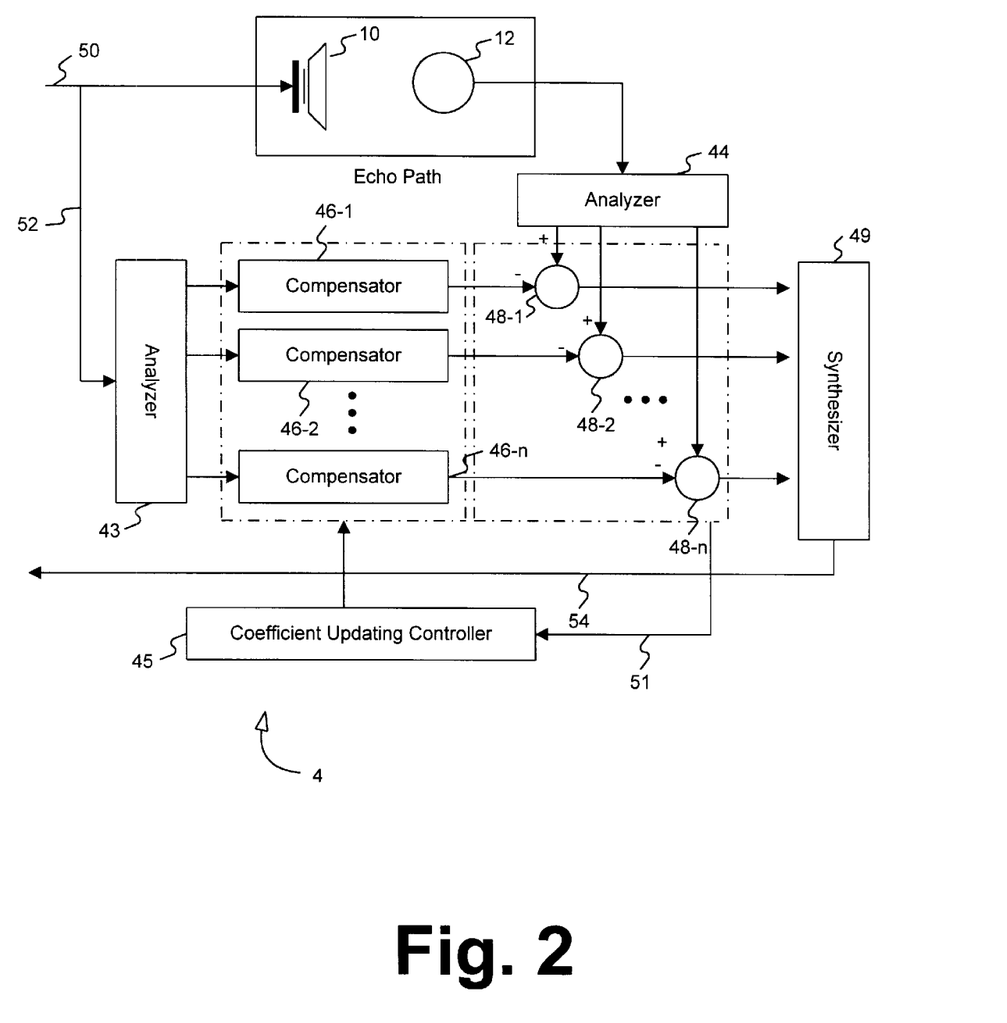
FIG. 2 shows a block diagram of a subband echo canceler constructed in accordance with the present invention.

FIG. 2 shows a block diagram of a subband echo canceler 4 of the present invention, which includes an input line 52, a first analyzer 43, a plurality of compensators, 46-1, 46-2 . . . 46-n, a coefficient updating controller 45, a second analyzer 44, a plurality of subtractors, 48-1, 48-2 . . . 48-n, a synthesizer 49, and an output line 54. A first audio signal from a far-end user is transmitted through a transmission line 50 and broadcasted through a loudspeaker 10 of a near-end user receiving the transmission. The first audio signal enters a microphone 12 as echoes either directly or indirectly with various time delays from reflecting off walls (not shown) in a room where loudspeaker 10 and microphone 12 are located. These undesired echoes are picked up by microphone 12 along with desired audio signals from the near-end user to form a second audio signal.

Input line 52 transmits the first audio signal to first analyzer 43 of echo canceler 4. First analyzer 43 divides the first audio signal into a predetermined number, n, of subbands in the frequency domain. Analyzer 43 provides each of the subbands to one of the plurality of compensators, 46-1, 46-2 . . . 46-n, where n is equal to the number of subbands. Each of the compensators includes a weighted transfer function to generate an artificial echo with reference to one of the subbands provided by analyzer 43. Each of the plurality of compensators is connected to a corresponding one of the plurality of subtractors, 48-1, 48-2 . . . 48-n, where n is equal to the number of subbands. Thus, the number of compensators is equal to the number of subtractors. Each of the plurality of compensators is also connected to coefficient updating controller 45, which functions to determine whether or not to update transfer function coefficients with reference to a psychoacoustic model masking curve on a subband-by-subband basis.

Figure 3:
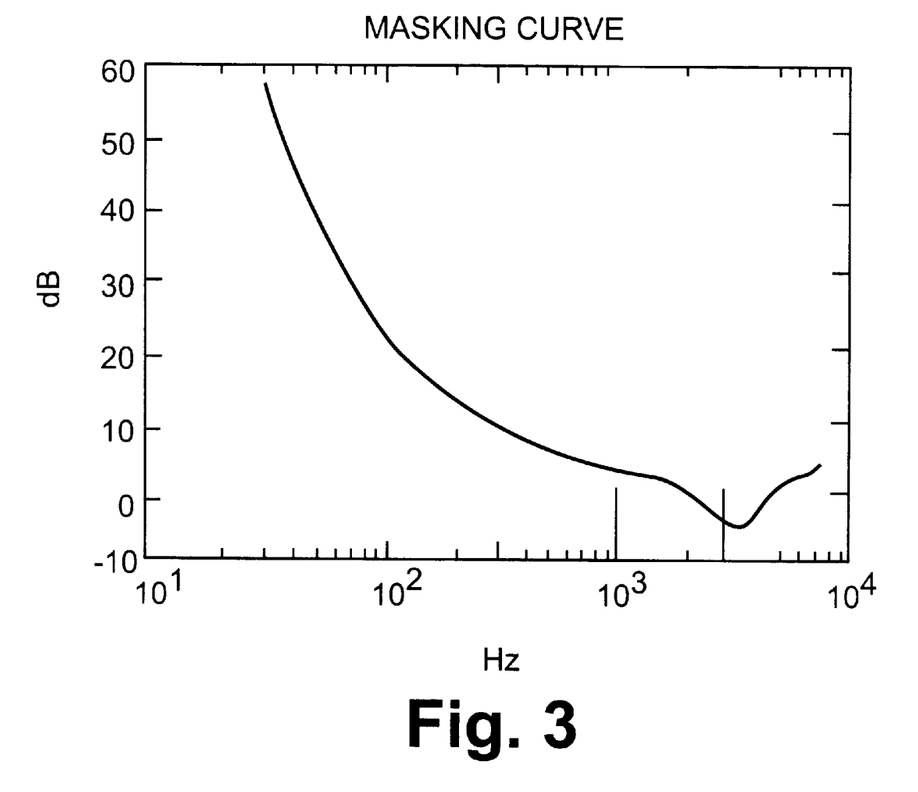
FIG. 3 shows an absolute masking curve of a psychoacoustic model in the frequency domain.

FIG. 3 shows an absolute masking curve of the psychoacoustic model in the frequency domain with reference to signal levels in decibels. An absolute masking curve represents the characteristics of the human auditory system in an environment where there are no other audio signals present except for an input audio signal to be perceived. An audio signal having a signal level above the curve is perceivable by the human ears, but the curve is frequency dependent. For example, the same input signal, having a signal level of 0 dB, is perceivable at approximately $2 \times 10^3$ Hz but imperceptible at $10^3$ Hz.

Figure 4:
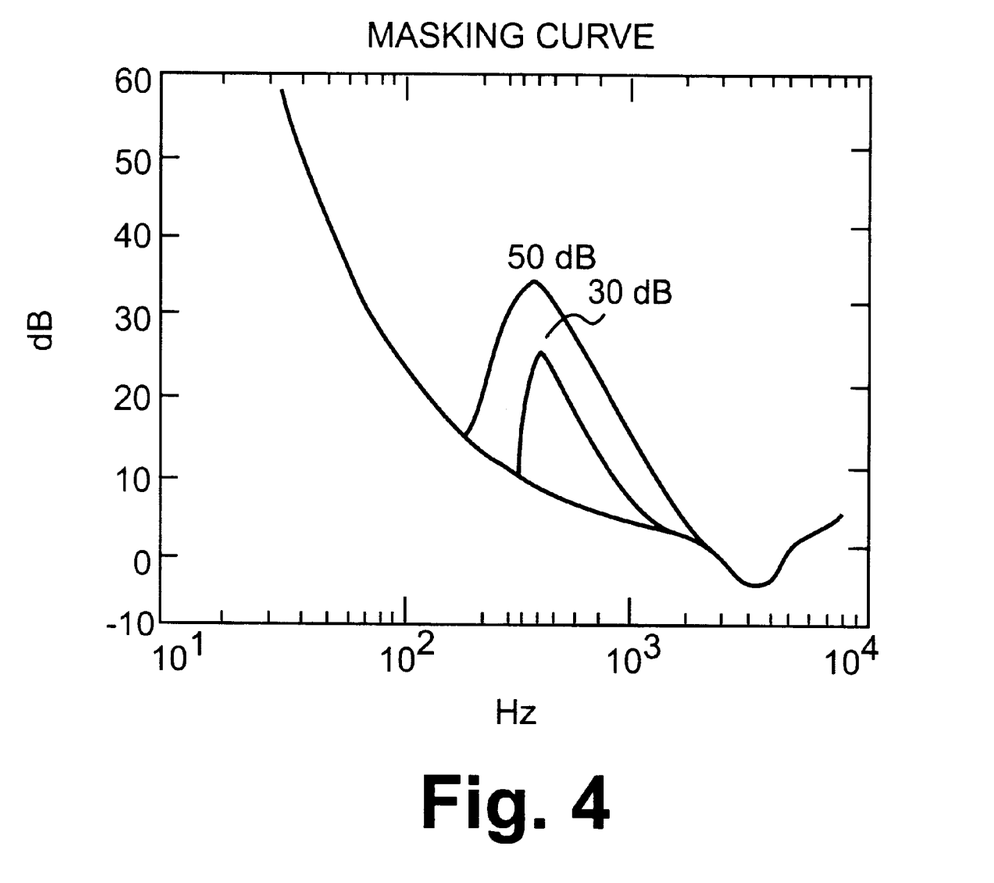
FIG. 4 shows a relative masking curve of the psychoacoustic model in the frequency domain.

FIG. 4 shows a relative masking curve of the psychoacoustic model in the frequency domain. As shown in FIG. 4, the masking curve changes when there are other audio signals present. These additional audio signals interfere with the human auditory system so that an otherwise perceivable audio signal in an "absolute" environment is imperceptible in the presence of other audio signals. As an example, when there is a 30 dB audio signal present, the absolute masking curve shown in FIG. 3 is shifted upwards such that a 20 dB audio signal at approximately 300 Hz, otherwise perceivable in an absolute environment, becomes imperceptible.

Based on the above described phenomena, the present invention takes into consideration the human psychoacoustic model in "weighting" the variable coefficient transfer functions of the compensators. In addition, instead of updating coefficients of the weighted transfer functions for each subband, the acoustic echo canceler according to the present invention determines whether or not to update the coefficients based on a psychoacoustic masking curve, either absolute or relative, on a subband-by-subband basis. Consequently, the number of computations required for updating the coefficients may be reduced because coefficients are no longer automatically updated for each subband.

Referring again to FIG. 2, the second audio signal, comprised of echoes of the first signal and audio signals generated from the near-end user, is transmitted to analyzer 44, where the signal is divided into a predetermined number of subbands. Analyzer 44 provides each of the subbands of the second audio signal to a corresponding one of the plurality of subtractors 48-1, 48-2 . . . 48-n for echo cancellation, and each subtractor is coupled to a corresponding one of the plurality of compensators, 46-1, 46-2 . . . 46-n.

Each of the plurality of subtractors 48-1, 48-2 . . . 48-n receives an artificial echo from one of the plurality of compensators and subtracts the artificial echo from one of the subbands of the second signal at the corresponding frequency to remove or reduce the echoes of the first audio signal. Each output of the plurality of subtractors 48-1, 48-2 . . . 48-n, constituting a "compensated subband signal," is provided to coefficient updating controller 45 through a control line 51. The compensated subband signals are also provided to synthesizer 49 to be recombined and transmitted to the far-end user through output line 54.

For each of the compensated subband signals provided to controller 45, a comparison is performed by controller 45 of the signal level of the compensated subband signal relative to a masking curve of the psychoacoustic model. If the signal level is below the masking curve, meaning the compensated subband signal is imperceptible, the transfer function coefficients will not be updated. Controller 45 performs the comparison function for each of the compensated subbands provided by the plurality of subtractors. In other words, controller 45 determines whether or not to update the coefficients of the transfer functions of the plurality of compensators based on a psychoacoustic model masking curve. The masking curve is compared to the signal level of each of the compensated subband signals to determine whether the compensated subband signal is perceivable. If a particular compensated subband signal is not perceivable, then the compensator coefficients for that subband are not updated thereby producing substantial savings in the number of calculations necessary for coefficient updating.

As already described, the perceivability of an audio signal depends greatly on the presence of other audio signals. Therefore, in a preferred embodiment, controller 45 takes into consideration a relative masking curve that compensates for the interference of the surrounding environment. After an artificial echo has been generated and subtracted from a signal containing undesired echoes, the resultant signal or compensated signal is provided to controller 45 to determine whether transfer function coefficients will be updated with reference to the relative masking curve.

The determination by controller 45 of the necessity to update compensator coefficients may be based on a known method published for the MPEG-2 audio standards for generic coding of moving pictures and associated audio information. This information is published in the Annex D to the ISO/IEC DIS 13818-3, which is hereby incorporated by reference. This publication describes a psychoacoustic model for lower sampling frequencies, and bit allocation of subbands is calculated on the basis of signal-to-mask ratios of the subbands. A nine-step process is also described to calculate the signal-to-mask-ratio:

1. Calculate the FFT for time to frequency conversion;
2. Determine the sound pressure level in each subband;
3. Determine the absolute (quiet) threshold;
4. Discriminate tonal (more sinusoid-like) from non-tonal (more noise like) components because the tonality of a masking component has an influence on the masking threshold;
5. Decimate the maskers to obtain only the relevant maskers from a global masking threshold;
6. Calculate the individual masking thresholds;
7. Determine the global masking threshold;
8. Determine the minimum masking threshold in each subband; and
9. Calculate the signal-to-mask ratio in each subband.

Only the first eight steps are required to implement the present invention.

The method of echo cancellation according to the present invention may be explained by reference to FIG. 5, which is a flow chart of the method. As stated previously, the echo canceler constructed in accordance with the present invention includes coefficient updating controller 45 to determine whether to update coefficients of a variable coefficient transfer function for echo cancellation with reference to a psychoacoustic masking model on a subband-by-subband basis.

Figure 5:
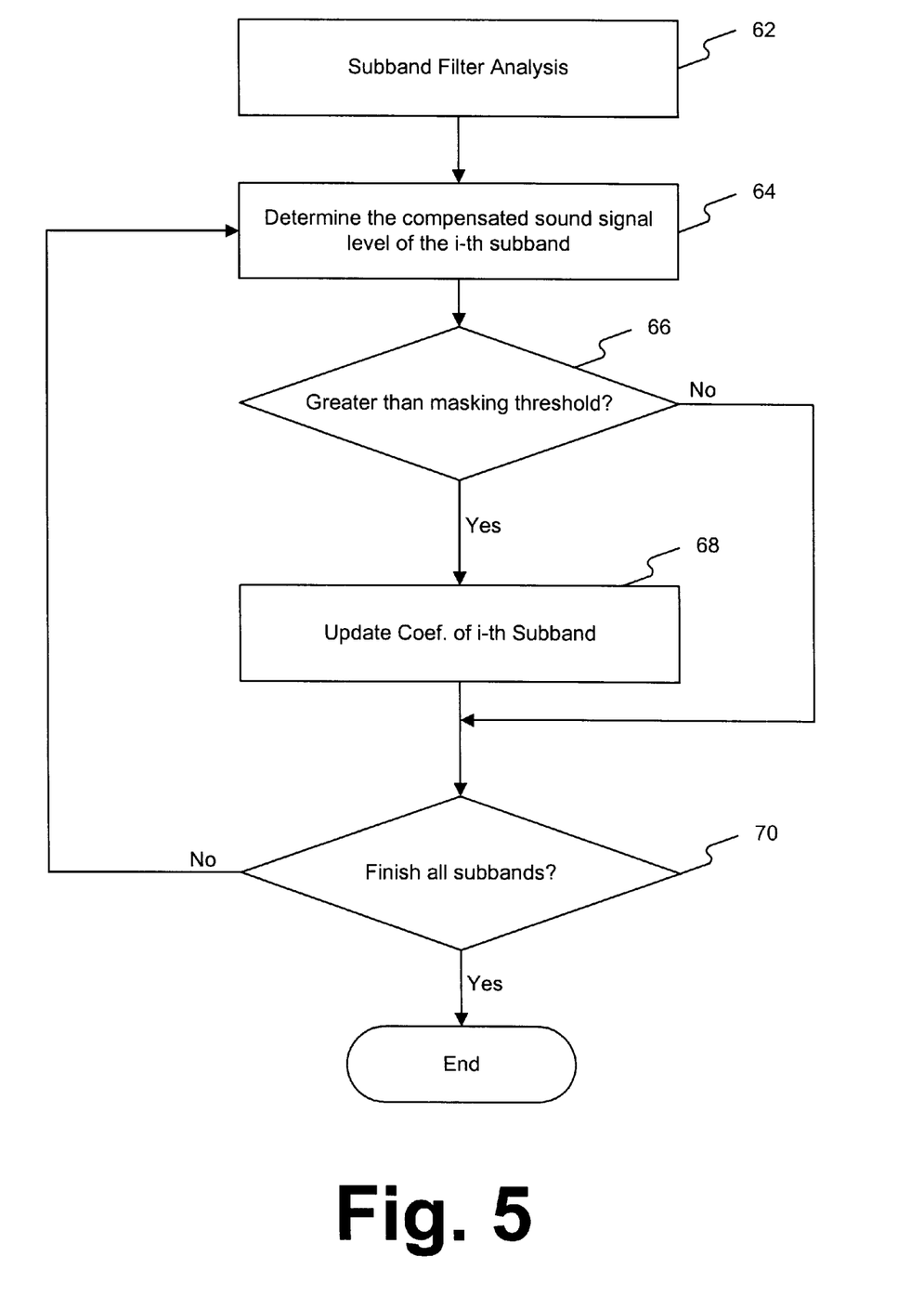
FIG. 5 shows a flow chart of a method for echo cancellation in accordance to the present invention.

Referring to FIG. 5, a first step 62 is a subband flit which an in step in which an input signal is divided into a predetermined number of subbands. Each of the subbands is compensated by having undesired echoes removed or reduced by artificial echoes generated from a plurality of compensators (not shown). The next step 64 determines the signal level of one of the compensated subbands, the ith subband. The signal level of the ith subband is then compared to a threshold value of a psychoacoustic masking curve at the corresponding frequency of the ith subband (step 66). If the signal level of the compensated subband is greater than the threshold value, meaning the compensated signal subband is perceivable, transfer function coefficients for the ith subband are updated (step 68). However, if, at step 66, the signal level of the compensated ith subband is less than or equal to the masking curve threshold value, meaning the compensated subband signal cannot be heard, the transfer function coefficients for the ith subband are not updated. The next step 70 determines if the above process has been applied to all of the compensated subbands to ensure that each of the compensated subbands is analyzed. If there are still compensated subbands that have not been analyzed and compared, steps 64, 66 and 68 are repeated for each of the remaining compensated subbands. Although not shown in FIG. 5, after all of the compensated subbands have been analyzed, they are recombined by synthesizer 49.

FIG. 5 represents the flow chart of one method of the present invention. Another method of the present invention is that step 66, wherein a compensated subband signal level is compared to a masking threshold, is performed after all of the subbands have been compensated before they are compared to the masking threshold.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for subband echo cancellation in a telecommunication system including an audio signal having at least one echo, comprising the steps of:

dividing the audio signal into a plurality of subbands; and selecting in turn each of said plurality of subbands and performing thereon reducing the echo of said selected subband based on a variable coefficient transfer function to produce a compensated subband, comparing a signal level of said compensated subband with a masking threshold value of a psychoacoustic model curve at a corresponding subband frequency, and updating a coefficient of said variable coefficient transfer function if said signal level of said compensated subband is greater than said threshold value.

2. The method as recited in claim 1 wherein said echo reducing step comprises the steps of:

generating an artificial echo signal based on said variable coefficient transfer function; and subtracting said artificial echo signal from said selected subband.

3. The method as recited in claim 1 wherein said psychoacoustic model curve accounts for interference due to additional audio signals.

4. A subband echo canceler for receiving a subband of a first audio signal and a second audio signal at a corresponding subband frequency, the second audio signal subband having echoes of the first audio signal subband, comprising:

compensating means for generating an artificial echo based on the first audio signal subband in accordance with a variable coefficient transfer function;

arithmetic means, coupled to said compensating means, for subtracting said artificial echo from the second audio signal subband; and control means, coupled to said arithmetic means, and said compensating means for determining whether to update coefficients of said variable coefficient transfer function by comparing an output of said arithmetic means with a masking threshold value of a psychoacoustic model at the corresponding subband frequency of the second audio signal subband.

5. The subband echo canceler as recited in claim 4 wherein said psychoacoustic model accounts for interference from other audio signals.

6. The subband echo canceler as recited in claim 4 wherein said control means comprises a coefficient updating controller.

7. The subband echo canceler as recited in claim 4 wherein said arithmetic means comprises an adder.

8. The subband echo canceler as recited in claim 4 wherein said compensating means comprises a compensator.

9. A subband echo canceler for receiving a first audio signal and a second audio signal having echoes of the first audio signal, comprising:

first analyzing means for dividing the first audio signal into a plurality of first subbands;

second analyzing means for dividing the second audio signal into a plurality of second subbands, each of said second subbands corresponding to one of said first subbands in the frequency domain;

at least one compensating means for receiving one of said first subbands and for generating an artificial echo based on said received first subband in accordance with a variable coefficient transfer function;

at least one arithmetic means, coupled to said compensating means, for subtracting said artificial echo from one of the second subbands at the corresponding frequency as said first subband; and control means, coupled to said arithmetic means and said compensating means, for determining whether to update a coefficient of said variable coefficient transfer function by comparing an output of said arithmetic means with a masking threshold value of a psychoacoustic model at the corresponding subband frequency.

10. The subband echo canceler as recited in claim 9 wherein said psychoacoustic model accounts for interference from other audio signals.

11. The subband echo canceler as recited in claim 9 wherein said control means comprises a coefficient updating controller.

12. The subband echo canceler as recited in claim 9 wherein said arithmetic means comprises an adder.

13. The subband echo canceler as recited in claim 9 wherein said compensating means comprises a compensator.

14. The subband echo canceler as recited in claim 9 wherein said first analyzing means comprises an analyzer.

15. The subband echo canceler as recited in claim 9 wherein said second analyzing means comprises an analyzer.

* * * * *

UNITED STATES PATENT AND TRADEMARK OFFICE
CERTIFICATE OF CORRECTION

PATENT NO. : 5,970,154
DATED : October 19, 1999
INVENTOR(S) : Wen-Yuan Chen et al.

It is certified that error appears in the above-identified patent and that said Letters Patent is hereby corrected as shown below:

On the title page, item:

[73] in the Assignee, change "China" to --Republic of China--

Signed and Sealed this

Sixteenth Day of May, 2000

Attest:

Q. TODD DICKINSON

Attesting Officer

Director of Patents and Trademarks